(12) United States Patent
Leclaire et al.

(10) Patent No.: US 9,631,114 B2
(45) Date of Patent: Apr. 25, 2017

(54) COATING COMPOSITION FOR AN OPTICAL ARTICLE, COMPRISING A COLLOIDAL SUSPENSION OF ZIRCONIA PARTICLES

(71) Applicant: ESSILOR INTERNATIONAL (COMPAGNIE GENERALE D'OPTIQUE), Charenton le Pont (FR)

(72) Inventors: Yves Leclaire, Charenton-le-Pont (FR); Stephanie Pega, Charenton-le-Pont (FR)

(73) Assignee: ESSILOR INTERNATIONAL (COMPAGNIE GENERALE D'OPTIQUE), Charenton Le Pont (FR)

( * ) Notice: Subject to any disclaimer, the term of this patent is extended or adjusted under 35 U.S.C. 154(b) by 312 days.

(21) Appl. No.: 14/359,411

(22) PCT Filed: Dec. 27, 2012

(86) PCT No.: PCT/EP2012/076940
§ 371 (c)(1),
(2) Date: May 20, 2014

(87) PCT Pub. No.: WO2013/098318
PCT Pub. Date: Jul. 4, 2013

(65) Prior Publication Data
US 2014/0307224 A1    Oct. 16, 2014

(30) Foreign Application Priority Data
Dec. 30, 2011   (EP) ..................... 11306815

(51) Int. Cl.
| G02C 7/02 | (2006.01) |
| C08K 3/22 | (2006.01) |
| C09D 163/00 | (2006.01) |
| C09D 183/04 | (2006.01) |
| B82Y 20/00 | (2011.01) |
| G02B 1/10 | (2015.01) |

(52) U.S. Cl.
CPC ............ C09D 163/00 (2013.01); B82Y 20/00 (2013.01); C09D 183/04 (2013.01); G02C 7/02 (2013.01); G02B 1/105 (2013.01)

(58) Field of Classification Search
CPC .............. C08K 3/22; C08L 63/00; G02C 7/02
USPC ............. 524/435; 523/440; 351/159.57
See application file for complete search history.

(56) References Cited

U.S. PATENT DOCUMENTS

| 4,211,823 A * | 7/1980 | Suzuki ............... C08K 3/36 427/164 |
| 4,722,833 A | 2/1988 | Kato |
| 7,850,842 B2 | 12/2010 | Hofstadt et al. |
| 9,250,360 B2 * | 2/2016 | Leclaire ............ B01J 13/0047 |
| 2002/0004544 A1 | 1/2002 | Kolb et al. |
| 2003/0165698 A1 | 9/2003 | Vaneeckhoutte et al. |
| 2010/0144918 A1 | 6/2010 | Chaput et al. |
| 2011/0245397 A1* | 10/2011 | Nakagawa ........... B82Y 30/00 524/413 |

FOREIGN PATENT DOCUMENTS

| CN | 1649668 | 8/2005 |
| CN | 101613123 A | 12/2009 |
| EP | 0 229 657 B1 | 7/1987 |
| EP | 0 233 343 B1 | 4/1991 |
| WO | 01/18128 A2 | 3/2001 |
| WO | 2008/139100 A2 | 11/2008 |

OTHER PUBLICATIONS

International Search Report, dated May 7, 2013, from corresponding PCT application.
Noh et al., "Synthesis and crystallization of anisotropic shaped ZrO2 nanocrystalline powders by hydrothermal process", Materials Letters, vol. 57, May 2003, pp. 2425-2431.
Srinivasan et al., "Identification of tetragonal and cubic structures of zirconia using synchrotron x-radiation source", Journal of Materials Research vol. 6, No. 6, Jan. 1, 1991, pp. 1286-1292.

* cited by examiner

*Primary Examiner* — Tae H Yoon
(74) *Attorney, Agent, or Firm* — Young & Thompson

(57) ABSTRACT

A coating composition includes a colloidal suspension of specific zirconia nano-particles, at least one epoxysilane and at least one catalyst. A method for preparing this composition, and its use for coating a transparent optical substrate, an optical article, such as an ophthalmic lens, including a transparent polymer substrate, especially an acrylic substrate, and a coating prepared from the composition, which is directly applied on the substrate, are also described.

17 Claims, No Drawings

COATING COMPOSITION FOR AN OPTICAL ARTICLE, COMPRISING A COLLOIDAL SUSPENSION OF ZIRCONIA PARTICLES

This application is a 371 National Phase Application of International Patent Application No. PCT/EP2012/076940, filed on Dec. 27, 2012, and claims the benefit of European Patent Application No. 11306815.9, filed on Dec. 30, 2011, all of which are incorporated herein by reference in their entirety.

FIELD OF THE INVENTION

The present invention pertains to a coating composition comprising a colloidal suspension of specific zirconia nanoparticles, at least one epoxysilane and at least one catalyst. It also pertains to a method for preparing this composition, and to its use for coating a transparent optical substrate. This invention is also directed to an optical article, such as an ophthalmic lens, comprising a transparent polymer substrate, especially an acrylic substrate, and a coating prepared from the aforesaid composition, which is directly applied on said substrate.

BACKGROUND OF THE INVENTION

It is well-known in the ocular glass field to use inorganic colloids in scratch-resistant and/or abrasion-resistant coatings (also referred to as "hard coats") for improving the surface properties of organic glasses and/or for modifying the refractive index thereof.

Zirconia, or zirconium dioxide, is one of these known colloids, because it provides a number of useful mechanical and physical properties, including high fracture toughness, mechanical strength and hardness, low thermal conductivity, high refractive index and transparency in the visible and infra-red spectral regions.

However, it may be difficult to produce in a simple and reproducible manner a colloidal suspension of zirconia with high crystallinity in the form of a stable homogeneous dispersion of nanoparticles (having an average particle size of less than 20 nm) at high solids content (at least 20 wt. % and up to 35 wt. %), and also to avoid their aggregation both during the preparation of the sol and during incorporation into a polymer matrix, for instance an epoxysilane matrix. Such a homogeneous dispersion is however required for the formation of a transparent zirconia-containing composite film and it directly affects the haze and transparency of the optical coating. This stable homogeneous dispersion may be expressed by the zeta potential of the suspension, which absolute value should be of at least 30 mV, and by its viscosity, which should be less than 10 cPs at 25° C. (no gelling should occur). The transparency is also ensured by the low particle size with uniform and narrow size distribution.

Thus, the methods that have been proposed to prepare colloidal zirconia, result either in a product having a low crystallinity, which affects the refractive index of zirconia colloids, and also their application in optical coatings (EP 0 229 657), or in dry powders made of particles which, when redispersed in a solvent, will remain aggregated in some extent (CN-101613120; by HUANG Y. et al. in *Wujiyan Gongye*, 37(7), 15-17 (2005). This will also be detrimental to the transparency of the colloidal suspensions obtained. These colloids are not suitable for preparing optical coatings.

Moreover, US 2010/0144918 and WO 2008/139100 disclose a method for preparing colloidal zirconia suspensions which may be used in the manufacture of hard-coats. This method in several synthesis steps results in an acidic zirconia sol in which zirconia is provided as crystals having a mainly tetragonal crystalline phase and which are suspended in an aqueous medium. These tetragonal crystals cannot be easily dispersed in the silane-based sol-gel hard-coat composition, neither when the crystals are dispersed in water, nor when they are dispersed in methanol after a solvent-exchange step. The appearance of the resulting hard-coat composition thus becomes progressively milky or colloid precipitation occurs, which is not desirable for the final transparency of the coating.

Other acidic zirconia sols comprising zirconia particles having mainly tetragonal and cubic crystal lattice structures have been disclosed in US 2002/004544. These crystals are considered as providing a lower aspect ratio than those having a monoclinic crystal phase, which is said to be favourable to their incorporation in high amounts in organic matrixes.

Other zirconia colloids are currently being sold for the manufacture of hard coats, such as those marketed by NISSAN CHEMICAL. The nano-particles in these colloids comprise other metal oxides besides zirconia.

The inventors have now discovered that zirconia sols comprising particles which have mainly a monoclinic crystal lattice structure allowed the formation of a composition with high solids content, which could be used to form a transparent hard-coat under economical conditions. Surprisingly, it has also been found that this coating could be applied directly to the polymer substrates generally used in ophthalmic lenses, without the need for any physical pre-treatment of the substrate like plasma, corona or UV irradiation, or inserting a primer coating (such as a polyurethane latex or an aminosilane layer) between the substrate and the hard-coat in order to improve the adhesion of the hard-coat. Moreover, the inventors have shown that this holds true also for acrylic substrates which are known to provide poor adhesion to their coatings absent the above treatments. This invention thus offers a way to produce low-cost ophthalmic lenses with high production yield, because it does neither require expensive treatments of the substrate nor the provision of a primer.

SUMMARY OF THE INVENTION

A first object of this invention is drawn to a coating composition comprising: (a) a colloidal suspension of zirconia particles comprising mainly single monoclinic rod-like crystallites, which particles represent from 10 to 85 dry wt. % of the dry weight of the composition, (b) at least one epoxysilane hydrolyzate, (c) optionally, at least one alkoxysilane which does not contain any reactive functional group, and (d) a curing catalyst, wherein the composition does not contain any other metal oxide than zirconia.

A second object of this invention pertains to a method for preparing said composition, comprising:

1—hydrolyzing the epoxysilane by means of a strong acid in a concentration of between 0.005 N and 0.1N, preferably between 0.005 and 0.05 N, 2—introducing the zirconia colloid into the epoxysilane hydrolyzate after the start of the hydrolysis, 3—adding the curing catalyst to the mixture resulting from step 2.

A third object of this invention is drawn the use of the above-mentioned composition for coating a transparent optical substrate, especially an acrylic substrate, wherein the coating is applied directly to said substrate.

A fourth object of this invention is directed to an optical article, such as an ophthalmic lens, comprising a transparent polymer substrate, especially an acrylic substrate, which has not been subjected to any physical pre-treatment suitable for activating its surface, and a coating prepared from the aforesaid composition, which is directly applied on said substrate.

A fifth object of this invention pertains to a method for manufacturing an optical article, comprising:

providing a transparent polymer substrate, especially an acrylic substrate, applying a coating prepared from the above-mentioned composition directly onto said substrate, without first subjecting said substrate to any physical pre-treatment suitable for activating its surface.

DETAILED DESCRIPTION OF THE INVENTION

In the present description, the expression "zirconia crystals having a mainly monoclinic crystalline phase" refers to zirconia crystals, the X-Ray diffractogram of which exhibits, at room temperature, peaks characteristic of the monoclinic phase according to Noh et al., *Materials Letters* 57 (2003) 2425 and do not exhibit any peak positioned at 30° (in 2θ°) characteristic of the cubic and/or tetragonal phases according to R. Srinivasan et al., *J. Mater. Res.* (1991) Vol. 6, No. 6, 1287. The rod-like morphology of the particles is also a feature characteristic of the monoclinic zirconia crystalline phase according to Noh et al., *Materials Letters* 57 (2003) 2425.

As mentioned above, the present invention is mainly drawn to a composition comprising: (a) a colloidal suspension of zirconia particles comprising mainly single monoclinic rod-like crystallites, (b) at least one epoxysilane hydrolysate, (c) optionally, at least one alkoxysilane which does not contain any reactive functional group, and (d) a curing catalyst, wherein the composition does not contain any other metal oxide than zirconia.

By the expression "the composition does not contain any other metal oxide than zirconia", it is meant that no metal oxide has been added to said composition, either separately from zirconia, or as a combination product with zirconia, which may be bound to zirconia in the same particles, for instance in core-shell particles wherein any of the core or the shell comprises zirconia and the other comprises the other metal oxide. However, this expression does not exclude solid solutions of zirconia with another metal oxide resulting from the synthesis of zirconia, wherein another metal, such as hafnium, is substituted for part of the zirconium atoms in the crystalline lattice of ZrO2. The substitution may affect less than 50%, preferably less than 20%, of the zirconium atoms.

The colloidal suspension of zirconia particles used in this invention may be prepared according to a process which will now be described.

This process comprises the following successive steps:

a) subjecting a mixture of zirconium oxychloride and an alkali metal halide in an aqueous solvent to hydrothermal treatment at a temperature above 150° C., b) desalting said slurry, for example by ultrafiltration, so as to form a colloidal suspension of zirconia, and c) optionally substituting at least one alcoholic solvent, such as methanol, for part or all of the aqueous solvent, for instance by dialysis.

In the first step of this method, zirconium oxychloride is used as a precursor of zirconium. Experiments have shown that this precursor results in zirconia which is better dispersed than when using other sources of zirconium, such as zirconium nitrate. Zirconium oxychloride is blended with a mineralizer, namely an alkali metal halide. The choice of this mineralizer is also critical because experiments have shown that it enhances the crystallinity of the zirconia colloid, which directly affects the dispersion, transparency and stability of this colloid. The alkali metal halide may be selected from KF, KCl, KBr, KI, NaF, NaCl, NaBr, NaI, LiF, LiCl, LiBr, LiI and their mixtures. Potassium chloride is preferred as a mineralizer.

The precursor and the mineralizer may be blended in any order, although it is preferred to add slowly an aqueous solution of the mineralizer into an aqueous solution of the precursor. Alternatively, a solid mineralizer may be added to a powder of the precursor, then both solids may be dissolved by adding water thereto. Zirconium oxychloride is preferably mixed with the alkali metal halide AX in a molar ratio of $AX/ZrOCl_2$ from 1/10 to 1/1 and preferably from 1/4 to 1/2. Moreover, the zirconium oxychloride concentration in said mixture may range from 0.5 to 4 mol/l and preferably from 1 to 2 mol/l.

The mixture used in step (a) preferably does not contain any ammonium salt or ammonia. This mixture is then subjected to a hydrothermal treatment, which may be conducted in an autoclave during at least one day, at a temperature of 150 to 220° C., preferably from 160 to 200° C. and more preferably from 175 to 190° C. In this step, it is preferable not to add any other solvent to the mixture, such as an alcohol, because it has been shown that using mixed water/methanol or water/ethanol solvents resulted in a very bad dispersion of zirconia, as evident from TEM images, which detrimentally affected the transparency of the suspension.

This hydrothermal treatment results in a two-phase system, namely a thick, white and viscous slurry containing most of the zirconia produced, and a transparent upper solution (or supernatant). According to an embodiment, this slurry may be taken out and peptized by adding thereto a strong acid such as nitric, sulphuric or hydrochloric acid, preferably hydrochloric acid, before performing step (b). According to another embodiment, the two-phase mixture comprising the slurry and the supernatant may be simply diluted with deionized water, together with stirring, before performing step (b). According to still another embodiment, the suspension obtained in step (a) may be directly subjected to the desalting treatment of step (b).

The resulting suspension may then be purified or desalted by any appropriate means, such as by ultrafiltration or dialysis. Dialysis is preferably performed on the suspension obtained directly from step (a) or subjected to a treatment according to the first embodiment above, whereas ultrafiltration is preferred in case the second embodiment above is carried out.

The dry matter content of the suspension may then be adjusted, if needed, up to 35 wt. %. Such adjustment may be obtained by concentrating the suspension, for instance by evaporation or by ultrafiltration, in order to obtain a colloidal suspension of zirconia with a high solids content, which can be shipped and stored at a decreased cost and enables the formulation of an optical coating having a higher solids content too.

This process may include a further step (c) of solvent-exchange, so as to substitute at least one alcoholic solvent for the aqueous solvent. This solvent ensures effective redispersion of the zirconia colloid in the composition of this invention. The fact that it may be easily dispersed in an alcoholic medium is a further advantage of the zirconia colloid used in this invention, compared to other kinds of colloidal zirconia which can only be suspended in water. Solvent-exchange may be performed by dialysis or diafiltration. The alcoholic solvent may be chosen from alcohols such as, but non-exhaustively, methanol, ethanol, 1-methoxy-2-propanol and their mixtures. The residual water content after solvent exchange may be maintained from 0 to 10% by weight of the final suspension.

The method of this invention may also include other intermediate or subsequent steps, in addition to those mentioned above. For instance, it can include a step of improving zirconia dispersion, either by adding a dispersant, or by surface modification of the zirconia, both of which may be performed either after the purification step or even after the solvent-exchange step described above.

Another intermediate or subsequent step can also be a step of pH modification by addition of an organic or inorganic base, which can be possibly followed by a desalting step to obtain the stable colloid in a basic pH.

The stabilization and the pH modification intermediate steps may advantageously be performed simultaneously by the addition of a single additive, selected amongst α-hydroxyacid salts, such as potassium sodium tartrate and trisodium citrate, and their mixtures, and possibly followed by a desalting step to adjust the basic pH of the stable colloid, typically between 8 and 10.

This step is preferably performed after the desalting step or after the solvent-exchange step.

The method of this invention results in a transparent colloidal suspension of highly crystalline zirconia, in which zirconia is provided as crystals having a mainly monoclinic crystalline phase, that is in the form of rod-like crystallites, the dimensions of which range preferably from 1 to 30 nm and most preferably from 1 to 15 nm along their short axis and preferably from 3 to 90 and most preferably from 3 to 30 nm along their long axis.

It is well understood that the dimensions along the "short axis" will be comprised within the above ranges but in any case smaller than those measured along the "long axis", which will also be comprised within the above ranges. Moreover, the dimensions of the crystallites may be tuned by selecting specific alkali metal halides; for instance, preliminary experiments have shown that larger particles may be obtained using fluorides instead of chlorides.

This suspension may also be characterized by its zeta potential, which absolute value is generally of at least mV and/or by the refractive index of the zirconia particles, which is usually of at least 1.8, preferably of at least 1.9, with a solid content of at least 15 wt. %, preferably of at least 20 wt. %. Its pH may be between 2 and 6 and is preferably between 3 and 5. Furthermore, its viscosity is preferably below 10 cPs, as measured at 25° C. with a Brookfield Viscosimeter DV-C with UL adapter.

Moreover, this suspension is usually free of any other mineral oxide than the zirconia described above.

The zirconia colloid represents from 10 to 85 dry wt. %, preferably from 25 to 75 dry wt. %, more preferably from 35 to 65 dry wt. %, of the dry weight of the composition of this invention.

This zirconia colloid is mixed, in the composition of this invention, with at least one epoxysilane hydrolyzate such as those traditionally used in abrasion- or scratch-resistant coatings.

Examples of epoxysilanes which may be used as component (b) are those of formula (I):

wherein:
$R^1$ is a linear or branched alkyl group with 1 to 6 carbon atoms, preferably a methyl or ethyl group, an acetyl group, or a hydrogen atom,
$R^3$ is a non-hydrolyzable group, such as a linear or branched alkyl group having from 1 to 6 carbon atoms,
n is 0 or 1,
W is an organic group containing at least one epoxy group.

Preferred epoxysilanes are those of formula (II):

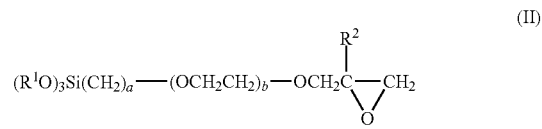

wherein:
$R^1$ is as defined above,
$R^2$ is a methyl group or a hydrogen atom,
a is an integer from 1 to 6,
b is 0, 1 or 2.

The following are examples of such epoxysilanes: γ-glycidoxypropyl trimethoxysilane and γ-glycidoxy-propyltriethoxysilane. Preferably, γ-glycidoxypropyl trimethoxysilane (GLYMO) is used.

When preparing the composition of this invention, the epoxysilane is hydrolyzed by means of a strong acid in a concentration of between 0.005 N and 0.1N, preferably between 0.005 and 0.05 N.

The epoxysilane hydrolyzate may represent from 10 to 90 wt. %, preferably from 30 to 60 wt. %, of the composition.

As mentioned above, an alkoxysilane (c) may be combined with the epoxysilane (b), usually to reduce the rigidity of the final coating obtained and to increase the shock resistance of the corresponding coated lens, while maintaining good abrasion resistance. Constituent (c) may have formula (III):

wherein each of the two groups $T^1$ and $T^2$ bonded to the silicon may be hydrolyzed to a hydroxy group and are independently selected from linear or branched alkoxy groups with 1 to 10 carbon atoms, and $Z^1$ and $Z^2$ are selected independently of each other from linear or branched alkoxy groups with 1 to 10 carbon atoms, linear or branched alkyl groups with 1 to 10 carbon atoms and aryl groups with 6 to 10 carbon atoms, such as a phenyl group. Examples of alkoxysilanes of formula (III) are: dimethyldimethoxysilane, dimethyldiethoxysilane (DMDES), methylphenyldimethoxysilane and tetraethylorthosilicate (TEOS).

Component (c) is usually hydrolyzed so as to produce the abrasion-resistant coating, using known sol-gel processes. The techniques described in EP 0 614 957 can be employed. It is preferable to use a stoichiometric amount of water for the hydrolysis, i.e. a molar quantity of water which corresponds to the number of moles of the alkoxy groups which can produce silanols. Hydrolysis catalysts such as hydrochloric acid, sulphuric acid, phosphoric acid, nitric acid and acetic acid may be employed. It is possible, for example, to mix the alkoxysilane and epoxysilane and then hydrolyze the mixture. Alternatively, components (b) and (c) may be separately subjected to hydrolysis before being mixed with the other constituents of the composition of this invention.

After component (b) and optionally component (c) have been hydrolyzed, the zirconia colloid described above may be introduced into the epoxysilane hydrolyzate. Such introduction is generally performed between 12 and 96 hours after the start of the hydrolysis.

Hydrolyzates may then condense spontaneously, in the presence of the catalyst (d) which may be chosen from the aforesaid acids or from metal halides, chelated compounds of acetylacetone and acetoacetate, carboxyl compounds of various metals (magnesium, titanium, zirconium tin . . . ) and perchlorates. Preferably, the catalyst is an aluminium chelate, i.e. a compound formed by reacting an aluminium alcoholate or acylate with nitrogen- and sulphur-free sequestrating agents which contain oxygen as the coordinating atom. The aluminium chelate is preferably selected from compounds having formula (IV):

$$AlX_vY_{3-v} \quad (IV)$$

wherein X is an OL group where L is a linear or branched alkyl group with 1 to 10 carbon atoms, Y is at least one coordinating product obtained from a compound having formula $M^1COCH_2COM^2$ or $M^3COCH_2COOM^4$, wherein $M^1$, $M^2$, $M^3$ and $M^4$ are linear or branched alkyl groups with 1 to 10 carbon atoms, and v takes the value 0, 1 or 2.

Examples of compounds having formula (IV) are aluminium acetylacetonate, aluminium ethyl-acetoacetate bisacetyl-acetonate, aluminium bisethyl-acetoacetate acetyl-acetonate, aluminium di-n-butoxide monoethylacetoacetate and aluminium diisopropoxide monomethyl acetoacetate.

Alternatively, constituent (d) may be a compound of formula (V) or (VI):

(V)

(VI)

wherein R and R' are linear or branched alkyl groups with 1 to 10 carbon atoms, R" is a linear or branched alkyl group with 1 to 10 carbon atoms, a phenyl group or a —OCOR group where R has the meaning given above, and n is an integer from 1 to 3.

Preferred compounds having formula (V) or (VI) are those where R' is an isopropyl or ethyl group and R and R" are methyl groups. One or more compounds having formula (IV), (V) or (VI) can be used as constituent (d).

In the process for preparing the composition of this invention, constituent (d) is added to the mixture of the zirconia colloid and the epoxysilane hydrolyzate between 5 minutes and 2 hours after introducing the colloid.

This catalyst is used in proportions which will harden the mixture over a period of a few hours at temperatures in the order of 100° C. It is generally used in a proportion of 0.1% to 5% by weight of the total composition weight. When constituent (d) is an aluminium chelate the composition preferably further comprises a constituent (e) which is an organic solvent whose boiling point $T_b$ at atmospheric pressure is between 70° C. and 140° C. Ethanol, isopropanol, ethyl acetate, methyl-ethylketone (MEK) or tetrahydropyrane can be used as constituent (e), wherein MEK is preferred.

Moreover, the composition of this invention can comprise other organic solvents (apart from constituent (e), if present), preferably alcohol type solvents such as methanol, which serve to adjust the viscosity of the composition.

Furthermore, this composition can also include various additives, such as surfactants or wetting agents to improve spreading of the composition over the surface to be coated, among which glycol ethers such as 1-methoxy-2-propanol, 2-methoxy-1-propanol and their mixtures (Dowanol® PM marketed by DOW CHEMICAL) and fluorcarbon containing organically modified polysiloxanes (EFKA® 3034 marketed by BASF) may be mentioned. The composition may further include UV absorbers, dye agents and/or pigments.

The above coating composition may be applied, for instance by dip coating or spin coating, onto a transparent polymer substrate. This substrate may be selected from, for instance polyamides; polyimides; polysulfones; polycarbonates and copolymers of polycarbonate and poly(ethylene terephtalate); polyolefins such as polynorbornene; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; homo- and copolymers of thiometh)acrylic acid and esters thereof; homo- and copolymers of poly(thio)urethane; epoxy homo- and copolymers; and episulfide homo- and copolymers.

Surprisingly, it has been found that the composition of this invention adheres sufficiently to said substrates, including the acrylic substrates, without the need for a primer or a mechanical physical (plasma or corona) or chemical pretreatment to activate the surface and improve adhesion.

The composition may be thermally hardened at a temperature ranging from 60° C. to 150° C., and preferably between 80 and 120° C., for instance between 80° C. and 150° C., for a period of between 30 min and 3 hours. The thickness of this coating may range from 1 to 50 µm and preferably between 1 and 10 µm.

It is thus possible to obtain an optical article, such as an ophtalmic lens, comprising a transparent polymer substrate directly coated with a hard-coat made from the composition of this invention.

EXAMPLES

This invention will be further illustrated by the following non-limiting examples which are given for illustrative purposes only and should not restrict the scope of the appended claims.

Example 1

Preparation of Colloidal Zirconia

A solution was prepared by dissolving 13.0 g of KCl in 80 ml of water under magnetic stirring. This solution was added into a solution prepared by dissolving 225.6 g of $ZrOCl_2.8H_2O$ in 250 ml of deionized water under magnetic stirring. Stirring was continued and the solution was then completed to 500 ml with water.

375 ml of the previous solution were poured into a 500 ml Teflon®-lined autoclave. The autoclave was placed in an oven and submitted to a temperature of 180° C. during 72 h. The supernatant was then removed to keep only the white slurry containing the zirconia particles.

2.4 l of HCl (0.1 M) were added slowly to the slurry under stirring. The suspension was then purified by ultrafiltration until a pH of 3.8 was reached. The dry content was adjusted between 16% and 16.5% and 380 mL of colloidal suspension was thus obtained.

The colloid suspension was then dialysed in contact with pure methanol until the water content was less than 0.1%. 330 ml of colloidal suspension in methanol was thus obtained, with a dry content of 21.6 wt. % including 21.16 wt. % of zirconia and 0.44 wt. % of chloride counter-ions.

According to X-Ray Diffraction and XFS analysis, the zirconia particles were composed of pure monoclinic $ZrO_2$ crystalline phase in which 6.5% of the Zr atoms were substituted by Hf atoms (impurities present in the raw material used for the synthesis of the zirconia).

The colloidal zirconia thus obtained had also the following features:

Appearance of the particles (Transmission Electron Microscopy): single rod-like monoclinic nanocrystallites with short axis range from 2 to 5 nm and long axis range from 3 to 14 nm (average particles dimensions=12 nm in length and 5 nm in width)

Zeta potential of the colloid: 34.5 mV pH of the suspension: 4.0

Example 2

Preparation of Compositions According to this Invention

Three compositions have been prepared as follows.

Composition A:

20.77 g of GLYMO have been hydrolyzed by 4.75 g of HCl 0.01 N. After 24 hours stirring at ambient temperature, 30.03 g of the colloid prepared in Example 1 were added. After further agitating the mixture for 30 min, 0.88 g of Al(acac)$_3$ with 2.65 g of methyl ethyl ketone (MEK) and 10.81 g of methanol were then added. The agitation was maintained for a further period of 30 min so as to dissolve the catalyst, then 0.11 g of EFKA® 3034 was added. The composition was left under stirring at ambient temperature for 24 hours before freezing it or using it.

The dry matter content of this composition (without catalyst) was 30 wt. %.

Composition B:

95.39 g of glycidoxypropyl trimethoxysilane (GLYMO) have been hydrolyzed by 21.82 g of HCl 0.01 N. After 24 hours stirring at ambient temperature, 311.35 g of the colloid prepared in Example 1 were added. After further agitating the mixture for 30 min, 4.05 g of Al(acac)$_3$, used as a catalyst, 12.15 g of MEK and 4.57 g of methanol were then added. The agitation was maintained for a further period of 30 min so as to dissolve the catalyst, then 0.68 g of EFKA® 3034 was added as a wetting agent. The composition was left under stirring at ambient temperature for 24 hours before freezing it or using it. The dry matter content of this composition (without catalyst) was 30 wt. %.

Composition C:

59.35 g of GLYMO have been hydrolyzed by 13.57 g of HCl 0.01 N. After 24 hours stirring at ambient temperature, 359.78 g of the colloid prepared in Example 1 were added. After further agitating the mixture for 30 min, 2.52 g of Al(acac)$_3$ were then added. The agitation was maintained for a further period of 30 min so as to dissolve the catalyst, then 0.60 g of EFKA® 3034 was added. The composition was left under stirring at ambient temperature for 24 hours before freezing it or using it. The dry matter content of this composition (without catalyst) was 27.53 wt. %.

Example 3

Preparation of Comparative Compositions

The preparation of the following comparative compositions has been adjusted so as to avoid precipitation of the zirconia colloid in the epoxysilane hydrolyzate.

Composition 1:

106 g of GLYMO have been mixed, in a reactor equipped with a cooling jacket, with 250 g of HZ® 307M6, a colloid supplied by NISSAN CHEMICAL, wherein each particle is constituted mainly of $ZrO_2$ mixed with few parts of $SnO_2$, $Sb_2O_5$ and $SiO_2$ and dispersed in methanol (dry matter content=30%). The mixture has been cooled to 5° C., before adding thereto 24.57 g of HCl 0.01 N. After 24 hours, 4.5 g of Al(acac)$_3$, 13.5 g of MEK and 101 g of methanol were added to the hydrolyzed mixture maintained at 5° C. Stirring was continued for 30 min so as to dissolve the catalyst. After adding 0.75 g of EFKA® 3034, the formulation was kept at 5° C. for 72 hours before freezing it or using it. The dry matter content of this composition (without the catalyst) was 30%.

Composition 2:

84.8 g of GLYMO have been mixed, in a reactor equipped with a cooling jacket, with 155.8 of HZ® 400M7, a colloid supplied by NISSAN CHEMICAL, wherein each particle is constituted mainly of $ZrO_2$ mixed with few parts of $SnO_2$ and $SiO_2$ and dispersed in methanol (dry matter content=38.5%). The mixture has been cooled to 5° C., before adding thereto 19.4 g of HCl 0.01 N. After 24 hours, 3.6 g of Al(acac)$_3$, 10.8 g of MEK and 125 g of methanol were added to the hydrolyzed mixture maintained at 5° C. Stirring was continued for 30 min so as to dissolve the catalyst.

After adding 0.60 g of EFKA® 3034, the formulation was kept at 5° C. for 72 hours before freezing it or using it. The dry matter content of this composition (without the catalyst) was 30%.

Composition 3:

63.59 g of GLYMO have been hydrolyzed by 14.54 g of HCl 0.01 N. During hydrolysis, the temperature raised up to 43.2° C. After 24 hours of stirring at ambient temperature, 116.88 g of HZ® 400M7 were added. After further agitating the mixture for 30 min, 2.70 g of Al(acac)$_3$, 8.10 g of MEK and 93.73 g of methanol were then added. The agitation was maintained for a further period of 30 min so as to dissolve the catalyst, then 0.45 g of EFKA® 3034 was added. The composition was left under stirring at ambient temperature for 24 hours before freezing it or using it. The dry matter content of this composition (without catalyst) was 30 wt. %.

Example 4

Adhesion Tests

The compositions prepared according to Examples 2 and 3 were applied to various ophthalmic lenses, namely:

HITOLEN® KR 60 TA (SHI DAE SPECIALTIES), which is an acrylic substrate with a refractive index of 1.60

MR-7® (MTSUI), which is a polythiourethane substrate with a refractive index of 1.67
and subjected to an adhesion test as follows.

The surface of the lenses was first cleaned and prepared by a usual sodic treatment in 10% NaOH aqueous solution at 60° C. with ultra-sonication during 4 min followed by rinsing with deionized water. Some of the lenses were coated without such surface preparation. The hard-coat compositions tested were deposited by spin-coating on the convex side. The coated lenses were cured for 3 hours at 100° C. for MR-7® lenses and 3 hours at 110° C. for HITOLEN® lenses. The hard-coat thickness after curing was 2.0 µm (±0.3 µm).

The adhesion of the different hard-coat formulations was then evaluated on the various substrates. To do so, a crosshatch adhesion test (ISTM 02-010) was performed on the lenses in various conditions:

without specific conditioning of the lenses (test called "dry adhesion")

after having submitted the lenses to UV ageing for periods of time ranging from 40 h to 200 h.

UV ageing was performed in a xenon test chamber Q-SUN® Xe-3 from Q-LAB at a relative humidity of 20% (±5%) and at a temperature of 23° C. (±5° C.). The lens was introduced in the chamber and the convex side was exposed to the light. The lens was exposed to UV during 40 h and then subjected to the crosshatch test. If the lens passed the test, it was subjected again to 40 h UV exposure, etc. until 200 h.

According to crosshatch test ISTM 02-010, a mark from 0 to 5 was given to the lens. With mark 0 or 1, the lens was acceptable (passed), whereas marks 2 to 5 were not acceptable (did not pass). Tables 1, 2 and 3 below show the results of the adhesion test. In these tables, the hard-coat compositions described in example 2 and in comparative example 3 were quoted "+" when all the tested lenses passed the crosshatch test and "−" when one or more lenses were rejected. If "dry adhesion" test failed, then "Adhesion after UV ageing" was not conducted.

TABLE 1

Adhesion on HITOLEN ® acrylic substrate with sodic surface prep.

| Composition | Relative weight ratio in the dry coating | | Dry Adhesion | Adhesion after UV ageing* | | | | |
|---|---|---|---|---|---|---|---|---|
| | Nano-particles | Glymo | | 40 h | 80 h | 120 h | 160 h | 200 h |
| A | 30 | 70 | + | + | + | + | + | + |
| B | 50 | 50 | + | + | + | + | + | + |
| C | 65 | 35 | + | + | + | + | + | + |
| 1 | 50 | 50 | − | nt | nt | nt | nt | nt |
| 2 | 50 | 50 | − | nt | nt | nt | nt | nt |
| 3 | 50 | 50 | − | nt | nt | nt | nt | nt |

*nt means not tested

As can be seen from this table, only the compositions of this invention, which comprised pure zirconia (i.e. without any other metal oxide), provided dry adhesion to the acrylic substrate. Moreover, this result was achieved with a wide range of colloid content in the coating.

TABLE 2

Adhesion on HITOLEN ® acrylic substrate without any surface prep.

| Composition | Relative weight ratio in the dry coating | | Dry Adhesion | Adhesion after UV ageing* | | | | |
|---|---|---|---|---|---|---|---|---|
| | Nano-particles | Glymo | | 40 h | 80 h | 120 h | 160 h | 200 h |
| B | 50 | 50 | + | + | + | + | + | + |
| C | 65 | 35 | + | + | + | + | + | + |
| 1 | 50 | 50 | − | nt | nt | nt | nt | nt |
| 2 | 50 | 50 | − | nt | nt | nt | nt | nt |
| 3 | 50 | 50 | − | nt | nt | nt | nt | nt |

*nt means not tested

The results in table 2 show that the coating compositions of this invention, containing pure zirconia particles, have good adhesion on acrylics, even without any chemical surface preparation of the lenses before hard-coating.

TABLE 3

Adhesion results on MR-7 lenses, with sodic surface prep.

| Composition | Relative weight ratio in the dry coating | | Dry Adhesion | Adhesion after UV ageing* | | | | |
|---|---|---|---|---|---|---|---|---|
| | Nano-particles | Glymo | | 40 h | 80 h | 120 h | 160 h | 200 h |
| B | 50 | 50 | + | + | + | + | − | nt |
| 1 | 50 | 50 | + | + | − | nt | nt | nt |
| 2 | 50 | 50 | + | + | + | − | nt | nt |
| 3 | 50 | 50 | + | − | nt | nt | nt | nt |

*nt means not tested

The results in Table 3 show that the coating composition of this invention, containing pure zirconia particles, demonstrates better adhesion durability upon UV exposure than the other coatings containing silica or mixed-oxide nanoparticles. Indeed, with composition B, results are good up to 120 h instead of 80 h only for the best other result (composition 2).

Example 5

Preparation and Characterization of Comparative Zirconia

A colloidal zirconia sol was prepared as described in US 2010/144918. To this end, 335 ml of a 3M ammonia solution were added to 1 l of a 0.5M zirconium oxychloride aqueous solution. Zirconium hydroxide precipitated under intense stirring. The precipitate was recovered by filtration onto a sintered glass. The thus obtained wet cake was purified by alternate re-dispersion in distilled water under vigorous stirring and filtration. Once the washing water pH had become stable around 7, the purification was ended. The cake was then re-dispersed into water under vigorous stirring in the presence of HCl with a HCl/Zr molar ratio of 0.1. The resulting milk was introduced into a beaker which was placed in an autoclave to carry out the hydrothermal treatment at 165° C. for 6 hours. A zirconia aqueous colloidal sol was thus obtained. Its stability was improved by dialyzing same with a Cellophane membrane for 7 days and then sonicating the sol thus obtained.

The particles included in this sol were analyzed by X-ray diffraction and high resolution TEM images and they were compared to those obtained according to Example 1.

The XRD pattern of the comparative particles exhibited a diffraction peak positioned at 30° (in 2θ) and more intense peaks at 50 and 60° than the particles of this invention. These are characteristic of the presence of a tetragonal phase in the sample (J. Mater. Res., Vol. 6, No. 6, June 1991) in addition to a monoclinic phase. Moreover, the comparative particles exhibited only an isotropic shape, whereas the particles of this invention had a rod-like shape characteristic of the monoclinic phase. This observation suggests that the monoclinic phase fraction in the comparative sample was far less than 50% by volume (J. Mater. Res., Vol. 6, No. 6, June 1991).

The invention claimed is:

1. A transparent coating composition comprising:
    (a) a transparent colloidal suspension of zirconia nanoparticles comprising mainly single monoclinic rod-shaped crystallites, which particles represent from 10 to 85 dry wt. % of the dry weight of the composition,
    (b) at least one epoxysilane hydrolyzate,
    (c) optionally, at least one alkoxysilane which does not contain any reactive functional group, and
    (d) a curing catalyst,
    wherein the composition does not contain any other metal oxide than zirconia.

2. The composition according to claim 1, wherein the colloidal suspension has a pH of from 2 to 6.

3. The composition according to claim 1, wherein the colloidal suspension is prepared by a process comprising the following successive steps:
    a) subjecting a mixture of zirconium oxychloride and an alkali metal halide in an aqueous solvent to hydrothermal treatment at a temperature above 150° C.,
    b) desalting said slurry, so as to form a colloidal suspension of zirconia, and
    c) optionally substituting at least one alcoholic solvent, for part or all of the aqueous solvent.

4. The composition according to claim 1, wherein dimensions of the crystallites range from 1 to 15 nm, along the crystallites' short axis and from 3 to 30 nm, along the crystallites' long axis.

5. The composition according to claim 1, wherein the epoxysilane is γ-glycidoxypropyl trimethoxysilane (GLYMO).

6. The composition according to claim 1, wherein the catalyst is aluminium acetyl acetonate.

7. The composition according to claim 1, which also comprises an organic solvent, an alcohol solvent, a wetting agent or a mixture thereof.

8. A method for preparing the composition of claim 1, comprising:
    1—hydrolyzing the epoxysilane by means of a strong acid in a concentration of between 0.005 N and 0.1N,
    2—introducing the zirconia colloid into the epoxysilane hydrolyzate after the start of the hydrolysis, and
    3—adding the curing catalyst to the mixture resulting from step 2.

9. A method for coating a transparent optical substrate, comprising:
    directly applying the composition of claim 1 to said substrate.

10. A method for manufacturing an optical article, comprising:
    providing a transparent polymer substrate,
    applying a coating prepared from the composition of claim 1 directly onto said substrate, without first subjecting said substrate to any physical pre-treatment suitable for activating a surface of the substrate.

11. The composition according to claim 1, wherein the colloidal suspension has a pH of from 3 to 5.

12. The composition according to claim 1, wherein dimensions of the crystallites range from 1 to 4 nm, along the crystallites' short axis and from 5 to 15 nm, along the crystallites' long axis.

13. The composition according to claim 1, wherein the epoxysilane has formula (I):

wherein:
    $R^1$ is a linear or branched alkyl group with 1 to 6 carbon atoms, an acetyl group, or a hydrogen atom,
    $R^3$ is a non-hydrolyzable group, or a linear or branched alkyl group having from 1 to 6 carbon atoms,
    n is 0 or 1, and
    W is an organic group containing at least one epoxy group.

14. The composition according to claim 1, wherein the epoxysilane has formula (II):

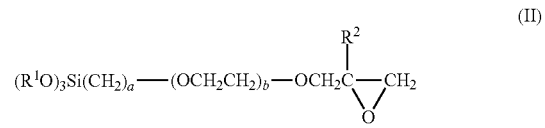

wherein:
    $R^1$ is a linear or branched alkyl group with 1 to 6 carbon atoms an acetyl group, or a hydrogen atom,
    $R^2$ is a methyl group or a hydrogen atom,
    a is an integer from 1 to 6, and
    b is 0, 1 or 2.

15. The composition according to claim 1, wherein the alkoxysilane has formula (III):

wherein each of the two groups T1 and T2 bonded to the silicon may be hydrolyzed to a hydroxy group and are independently selected from linear or branched alkoxy groups with 1 to 10 carbon atoms, and
    Z1 and Z2 are selected independently of each other from linear or branched alkoxy groups with 1 to 10 carbon atoms, linear or branched alkyl groups with 1 to 10 carbon atoms and aryl groups with 6 to 10 carbon atoms.

16. The composition according to claim 1, wherein the catalyst is an aluminium chelate having formula (IV)

wherein X is an OL group where L is a linear or branched alkyl group with 1 to 10 carbon atoms,
    Y is at least one coordinating product obtained from a compound having formula $M^1COCH_2COM^2$ or $M^3COCH_2COOM^4$, wherein M1, M2, M3 and M4 are linear or branched alkyl groups with 1 to 10 carbon atoms, and v takes the value 0, 1 or 2.

17. The method according to claim 10, wherein the substrate is an acrylic substrate.

\* \* \* \* \*